United States Patent
Formanek

(10) Patent No.: US 6,784,645 B2
(45) Date of Patent: Aug. 31, 2004

(54) STEP-DOWN CONVERTER

(75) Inventor: Karl Formanek, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/607,199

(22) Filed: Jun. 27, 2003

(65) Prior Publication Data
US 2004/0070375 A1 Apr. 15, 2004

Related U.S. Application Data

(63) Continuation of application No. PCT/DE01/04701, filed on Dec. 13, 2001.

(30) Foreign Application Priority Data

Dec. 27, 2000 (DE) .......................... 100 65 421

(51) Int. Cl.⁷ .............................. G05F 1/613; G05F 1/40
(52) U.S. Cl. ...................... 323/225; 323/284; 323/285
(58) Field of Search ................................ 323/222, 225, 323/282, 284, 285, 290

(56) References Cited

U.S. PATENT DOCUMENTS

| 5,886,512 A | * | 3/1999 | Becerra ....................... 323/282 |
| 6,229,292 B1 | * | 5/2001 | Redl et al. ................... 323/285 |
| 6,495,993 B2 | * | 12/2002 | Eagar .......................... 323/271 |

FOREIGN PATENT DOCUMENTS

| JP | 02070261 A | 3/1990 |
| JP | 08149804 A | 6/1996 |
| JP | 10014127 A | 1/1998 |
| JP | 10210734 A | 8/1998 |
| WO | WO 99/13559 A | 3/1999 |

* cited by examiner

Primary Examiner—Jessica Han
(74) Attorney, Agent, or Firm—Sughrue Mion, PLLC

(57) ABSTRACT

A step-down converter includes a self-conducting switching transistor (T1) and an inductance (L) located in a series arm, and a freewheeling diode ($D_F$) located in a shunt arm. The switching transistor (T1) is controlled by a control transistor (T2). The control transistor supplies a blocking voltage, which is generated by a Zener diode (D1) in the series arm, to the switching transistor (T1) once a maximum value for a current ($I_L$) in the series arm has been reached.

6 Claims, 1 Drawing Sheet

STEP-DOWN CONVERTER

This is a Continuation of International Application PCT/DE01/04701, with an international filing date of Dec. 13, 2001, which was published under PCT Article 21(2) in German, and the disclosure of which is incorporated into this application by reference.

FIELD OF AND BACKGROUND OF THE INVENTION

The invention relates to a step-down converter for converting a DC input voltage into a DC output voltage. Therein, a controlled switch and an inductance are series-connected in a series arm of the step-down converter. A freewheeling diode is arranged in a shunt arm between the controlled switch and the inductance, and a smoothing capacitor is arranged at the output side of the step-down converter. The controlled switch is controlled by a control circuit as a function of the current flowing through the series arm so that the controlled switch periodically opens and closes.

Step-down converters of this type are known in the art in many different variations. They are used, for example, for charging accumulators, for supplying power to light emitting diodes, or for supplying power to primary control circuits of switched mode power supplies.

WO 99/13559 discloses a DC/DC step-down converter that has a switching regulator. The switching regulator has switching means to switch the unregulated DC input voltage; a current-sensor-amplifier to control the switching means; a hysteresis generator to control the current-sensor-amplifier; and an output circuit to generate a regulated DC signal for the output.

If one wants to use step-down converters of the aforementioned type in a conventional domestic power system with 230 volts AC—or approximately 325 volts after rectification—without the insertion of a transformer, a problem arises that not only the controlled switch but also the associated control circuit must have the required electric strength. Since, after power-up, there is no other voltage source other than the aforementioned high input voltage, the high input voltage must be accessed. To block one of the self-blocking field effect transistors conventionally used, the gate voltage must be turned off again, so that the full input voltage is applied. Moreover, a protective circuit for the gate must be provided in order to protect against excessively high voltages. This increases the component costs.

In another embodiment, the gate voltage is not turned off, and the gate is briefly closed. In this case, there are no special voltage requirements for the switch element, but the voltage supply for the gate must always be generated from the high input voltage. For this purpose, a series resistor is used, which, in turn, results in an undesirably high power loss. Such a series resistor must be so dimensioned that it is suitable for the high input voltage and for an increased power output. As a result, for a power-optimized series resistor, the broad input voltage range of such a step-down converter, which is normally desirable, is eliminated.

OBJECTS OF THE INVENTION

It is one object of the invention to provide a step-down converter that can be realized with a high input voltage range at low cost and with minimal power loss.

SUMMARY OF THE INVENTION

According to one formulation of the invention, this and other objects are achieved by a step-down converter for converting a DC input voltage into a DC output voltage, wherein a series arm of the step-down converter includes a controlled switch that has a self-conducting switching transistor; an inductance that is series-connected to the controlled switch; a first Zener diode; and a current sensor that senses a current flowing through the series arm. The step-down converter further includes a freewheeling diode that is arranged in a shunt arm between the controlled switch and the inductance; a capacitor parallel-connected to the first Zener diode; a smoothing capacitor arranged at an output of the step-down converter; and a control circuit having a control transistor, wherein the control transistor periodically opens and closes the controlled switch as a function of the current that flows through the series arm.

Therein, the first Zener diode and the capacitor that is parallel-connected to the first Zener diode generate a blocking voltage, which is supplied to the self-conducting switching transistor when the current sensor senses at least a pre-determined maximum value of the current.

By using a self-conducting switching transistor, the control circuit or the controlled switching element can be configured with substantially lower electric strength and is therefore less expensive. Series resistors for the power supply of the control circuit are not required, so that the associated energy dissipation is eliminated.

It is advantageous to parallel-connect a capacitor to the first Zener diode. Thereby, a blocking voltage is maintained for the field effect transistor, even if there is no current flowing anymore.

It is further advantageous to configure the switching transistor as a depletion-FET and to connect gate and drain to each other by a gate-drain resistor.

A cost-effective and simple embodiment is achieved by configuring the current sensor in the series arm as a sensor-resistor. The voltage drop occurring on the sensor-resistor can be supplied to the base-emitter path of the control transistor. Therein, the collector of the control transistor is led to the gate of the switching transistor. Advantageously, the sensor-resistor is located in the series arm between the Zener diode and the inductance.

To improve the switching behavior, it is advantageous to provide a discharge transistor, whose collector-emitter path, in series with a discharge resistor, bridges the gate-source path of the switching transistor. Therein, the voltage drop on an additional sensor-resistor in the series arm can be supplied to the base-emitter path of the discharge transistor.

To prevent damage to the smoothing capacitor if the load is eliminated, the output voltage at the smoothing capacitor is limited by a voltage limiter, such as a second Zener diode.

BRIEF DESCRIPTION OF THE DRAWINGS

Exemplary embodiments of the invention and advantages thereof will now be described in greater detail with reference to the drawings, in which.

DETAILED DESCRIPTION OF THE PREFERRED EMBODIMENTS

Figure 1:
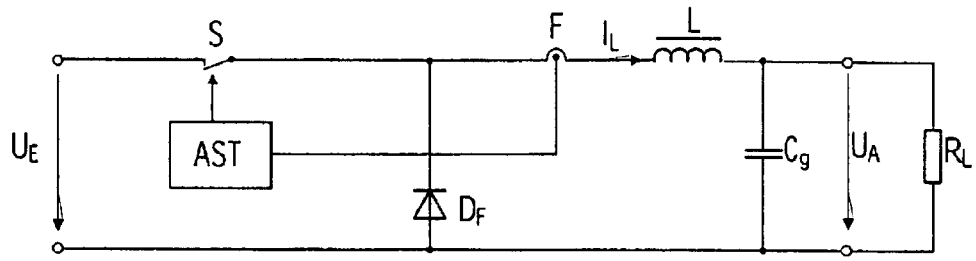
FIG. 1 is a circuit diagram of a step-down converter according to an exemplary embodiment of the invention.

As shown in FIG. 1, a controlled switch S is arranged in a series arm of a step-down converter, wherein the controlled switch S is opened and closed via a control circuit AST as a function of a current in the series arm that is measured by a sensor F. Downstream of the controlled switch S in the series arm, there is an inductance L, through which a current $I_L$ flows to a load resistor $R_L$ or to a parallel-connected, smoothing capacitor $C_g$. To make the circuit operational, a freewheeling diode $D_F$ is provided, which is, as shown, located in the shunt arm between the controlled switch S and the inductance L, so that the energy stored in the inductance L can be supplied to the load. The mode of operation of such a circuit, which converts a DC input voltage $U_E$ in the order of, e.g., 50–350 volts into a DC output voltage $U_A$ of, e.g., 12 volt, is known.

Figure 2:
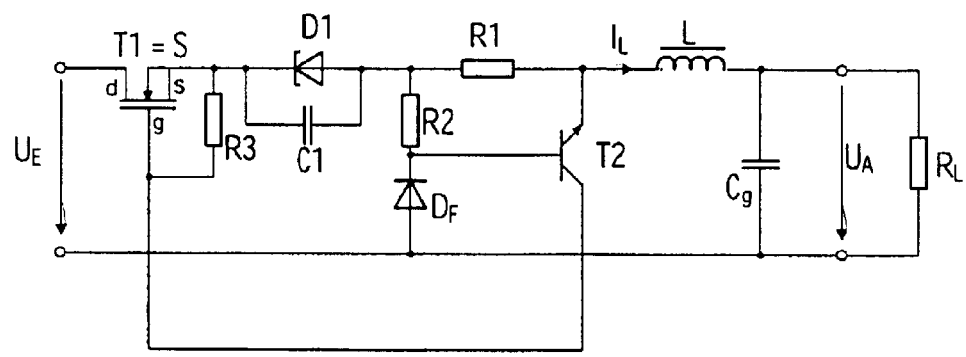
FIG. 2 is a simplified circuit diagram of a step-down converter according to an exemplary embodiment of the invention.

FIG. 2 shows an exemplary embodiment of a circuit according to the invention in which the controlled switch S is configured as a depletion-type FET T1. Such an FET is self-conducting. Source and gate of the transistor T1 are connected to each other by a source-gate resistor R3. In the series arm, the transistor T1 is followed by a Zener diode D1, which has a Zener voltage in the range of a few volts, e.g., 6 volts. Therein, the Zener diode D1 is bridged by a capacitor C1. Furthermore, in the series arm, there is a sensor-resistor R1 and the inductance L, which leads to the output having the smoothing capacitor $C_g$ and the load, here identified as the resistor $R_L$. Between the sensor-resistor R1 and the Zener diode D1 in the series arm, a resistor R2 leads to the freewheeling diode $D_F$. The voltage drop on the resistor R1 that is associated with the current $I_L$ is detected by a control transistor T2, i.e., the voltage drop is supplied to the base-emitter path of the control transistor T2. The emitter of the control transistor T2 is located in the series arm between the sensor-resistor R1 and the inductance L, whereas its collector is lead to the gate of the FET T1.

The mode of operation of the circuit will now be briefly explained. As soon as an input voltage $U_E$ occurs, a current flows through the FET T1, the capacitor C1, the sensor-resistor R1, the inductance L, and the resistor $R_L$. The current rises essentially linearly until the voltage drop on R1, which is associated with the increased current $I_L$, is so large that the transistor T2 becomes fully conductive and that the significant voltage drop on the Zener diode D1 reaches the gate of the FET T1 as a blocking voltage, so that this transistor blocks. Now the energy is discharged from the inductance L, wherein a current flows through the resistor R1, the resistor R2 and the freewheeling diode $D_F$. In this case, the control transistor T2 remains conducting, and the FET T1 remains blocked. As the current drops in this discharge phase of the inductance L, the base current through the control transistor T2 also drops, so that the FET T1 finally becomes conducting again. The capacitor C1, which is parallel-connected to the Zener diode D1 in the series arm, is very important during the blocking phase of the FET, because the capacitor C1 maintains a blocking voltage even when the current ceases to flow.

Figure 3:
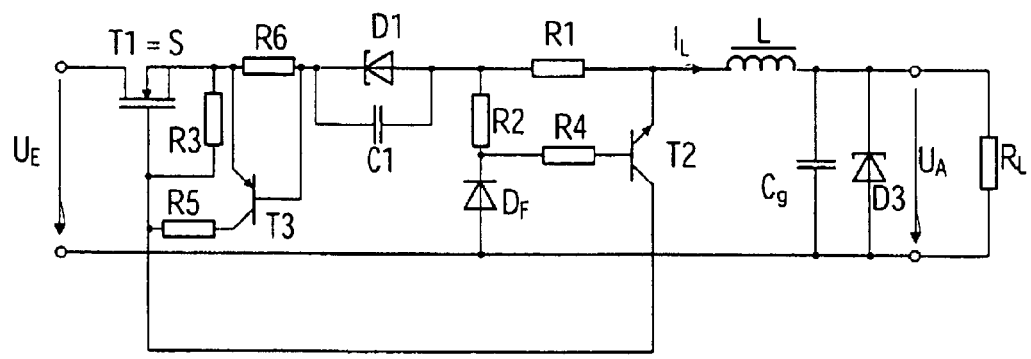
FIG. 3 is a circuit according to FIG. 2, which has a discharge transistor and a voltage limiter at the output.

FIG. 3 illustrates how the power-down behavior of the field effect transistor can be improved by using a discharge transistor T3. According to FIG. 3, an additional resistor R6 is located in the series arm between the FET T1 and the Zener diode D1. The voltage drop on the additional resistor R6 is supplied to the emitter or the base of the discharge transistor T3, whereas the collector of the discharge transistor T3 is led to the gate of the FET T1 via a resistor R5. In practice, the resistance value of the collector resistor R5 is, e.g., approximately 1/10 of the resistance value of the gate-source resistor R3. When the FET T1 becomes conducting again, a voltage occurs on the resistor R6 and a current flows into the base of the discharge transistor T3, which now becomes fully conductive, so that the gate load can be quickly discharged via the comparatively low-impedance resistor R5.

The invention provides an energy-saving and cost-effective power supply for loads, in particular for loads having small power outputs, which are to be supplied directly from the power supply system, e.g., the 230-volt domestic power supply system. For example, a small transformer and a series resistor, which causes heat development and unnecessary energy consumption, is eliminated. On the one hand, the circuit is short-circuit proof, and the maximum current, i.e., the "charging current", of the inductance L is primarily determined by the resistor R1. On the other hand, the value of the resistor R2, together with the value of the resistor R1, determine the discharge current of the inductance L. Through appropriate dimensioning of the resistors R1 and R2, it is possible to adapt the power to the respective load. Since the load current is approximately constant over a wide range, the input and output power depend on the output voltage $U_A$. In the embodiment according to FIG. 3, the output voltage $U_A$ is limited, e.g., to 12 volts, by a Zener diode D3. Without such a limitation, the voltage on the smoothing capacitor $C_g$ would, in principle, assume the value of the input voltage $U_E$, if the load were eliminated ($R_L = \infty$).

Although the circuit according to FIG. 3 is highly recommended, it is noted that the discharge transistor T3 is not required for small power or low current step-down converters. This results in the circuit according to FIG. 2, in which, of course, a Zener diode D3 could likewise be present to limit the output voltage.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A step-down converter for converting a DC input voltage into a DC output voltage, comprising:
   a series arm, comprising:
     a controlled switch having a self-conducting switching transistor;
     an inductance series-connected to the controlled switch;
     a first Zener diode; and
     a current sensor configured to sense a current flowing through the series arm;
   a shunt arm arranged between the controlled switch and the inductance, the shunt arm comprising a freewheeling diode;
   a capacitor parallel-connected to the first Zener diode;
   a smoothing capacitor arranged at an output of the step-down converter; and
   a control circuit having a control transistor, wherein the control transistor is configured to periodically open and close the controlled switch as a function of the current; and
   wherein the first Zener diode and the capacitor parallel-connected to the first Zener diode are configured to generate a blocking voltage, which is supplied to the self-conducting switching transistor when the current sensor senses at least a pre-determined maximum value of the current.

2. A step-down converter as claimed in claim 1, further comprising:

a gate-source resistor;

wherein the switching transistor comprises a depletion-FET, and wherein the gate-source resistor is configured to connect the gate and the source of the depletion-FET to each other.

3. A step-down converter as claimed in claim 2, wherein the current sensor comprises a sensor-resistor, wherein a voltage drop occurring on the sensor-resistor is supplied to a base-emitter path of the control transistor; and wherein the collector of the control transistor is led to the gate of the switching transistor.

4. The step-down converter as claimed in claim 3, wherein the sensor-resistor is arranged in the series arm between the first Zener diode and the inductance.

5. The step-down converter as claimed in claim 2, further comprising:

a discharge transistor;

a discharge resistor; and a sensor-resistor arranged in the series arm;

wherein a series connection of a collector-emitter path of the discharge transistor and the discharge resistor bridges a gate-source path of the switching transistor; and wherein a voltage drop on the sensor-resistor is supplied to a base-emitter path of the discharge transistor.

6. A step-down converter as claimed in claim 1, wherein the DC output voltage at the smoothing capacitor is limited by a second Zener diode.

* * * * *